United States Patent
Mobin et al.

(10) Patent No.: US 8,867,602 B1
(45) Date of Patent: Oct. 21, 2014

(54) PRE AND POST-ACQUISITION TAP QUANTIZATION ADJUSTMENT IN DECISION FEEDBACK EQUALIZER

(71) Applicant: LSI Corporation, San Jose, CA (US)

(72) Inventors: Mohammad S. Mobin, Orefield, PA (US); Weiwei Mao, Macungie, PA (US); Ye Liu, San Jose, CA (US); Brett D. Hardy, Chaska, MN (US); Lane A. Smith, Easton, PA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/011,236

(22) Filed: Aug. 27, 2013

Related U.S. Application Data

(60) Provisional application No. 61/859,919, filed on Jul. 30, 2013.

(51) Int. Cl.
*H03H 7/30* (2006.01)
*H04L 25/03* (2006.01)

(52) U.S. Cl.
CPC .............................. *H04L 25/03885* (2013.01)
USPC ............................ 375/232; 375/233; 708/323

(58) Field of Classification Search
USPC .......... 375/229, 230, 232, 233, 350; 708/300, 708/301, 322, 323
See application file for complete search history.

(56) References Cited

U.S. PATENT DOCUMENTS

| 8,073,046 | B2 | 12/2011 | Cohen et al. | |
|---|---|---|---|---|
| 8,121,183 | B2 | 2/2012 | Zhong et al. | |
| 8,442,106 | B2 | 5/2013 | Liu et al. | |
| 2010/0158096 | A1* | 6/2010 | Yang et al. | 375/233 |
| 2013/0121396 | A1 | 5/2013 | Huang et al. | |
| 2013/0315290 | A1* | 11/2013 | Farjad-rad | 375/232 |
| 2014/0029651 | A1* | 1/2014 | Zhong | 375/219 |

* cited by examiner

*Primary Examiner* — Dac Ha
(74) *Attorney, Agent, or Firm* — Suiter Swantz pc llo

(57) ABSTRACT

A tap coefficient control circuit and a method for controlling a tap coefficient for a decision feedback equalizer are disclosed. The method includes adjusting a correction voltage applied to the tap coefficient based on a first tap quantization and detecting a decision feedback equalizer tap convergence. After the decision feedback equalizer tap convergence is detected, the method adjusts the correction voltage applied to the tap coefficient based on a second tap quantization, wherein the second tap quantization is different from the first tap quantization.

20 Claims, 4 Drawing Sheets

PRE AND POST-ACQUISITION TAP QUANTIZATION ADJUSTMENT IN DECISION FEEDBACK EQUALIZER

CROSS-REFERENCE TO RELATED APPLICATIONS

The present application claims the benefit under 35 U.S.C. §119(e) of U.S. Provisional Application Ser. No. 61/859,919, filed Jul. 30, 2013. Said U.S. Provisional Application Ser. No. 61/859,919 is hereby incorporated by reference in its entirety.

TECHNICAL FIELD

The present invention relates to the field of data communication and particularly to decision feedback equalizers.

BACKGROUND

In a data communication system, an equalizer is a device that attempts to reverse the distortion incurred by a signal transmitted through a channel. A decision feedback equalizer (DFE) is a type of equalizer that adapts to certain properties of the communication channel. More particularly, feedback of detected symbols is used in a DFE in addition to conventional equalization of future symbols.

SUMMARY

Accordingly, an embodiment of the present disclosure is directed to a method for controlling a tap coefficient for a decision feedback equalizer. The method includes adjusting a correction voltage applied to the tap coefficient based on a first tap quantization, and detecting a decision feedback equalizer tap convergence. After the decision feedback equalizer tap convergence is detected, the method adjusts the correction voltage applied to the tap coefficient based on a second tap quantization, wherein the second tap quantization is different from the first tap quantization.

A further embodiment of the present disclosure is directed to a tap coefficient control circuit for controlling a tap coefficient for a decision feedback equalizer. The tap coefficient control circuit includes a first set of taps for adjusting a correction voltage applied to the tap coefficient. The tap coefficient control circuit also includes a second set of taps for adjusting the correction voltage applied to the tap coefficient. The tap coefficient control circuit further includes a control circuit for selectively engaging taps in a subset of the first set of taps prior to detection of a decision feedback equalizer tap convergence, and selectively engaging taps in a subset of the second set of taps after detection of the decision feedback equalizer tap convergence.

An additional embodiment of the present disclosure is directed to a method for controlling a tap coefficient for a decision feedback equalizer. The method includes: adjusting a correction voltage applied to the tap coefficient by selectively engaging at least taps in a subset of a first set of taps; detecting a decision feedback equalizer tap convergence; and adjusting the correction voltage applied to the tap coefficient by selectively engaging at least taps in a subset of a second set of taps, wherein the taps in the subset of the second set of taps have a different tap quantization than the taps in the subset of the first set of taps.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
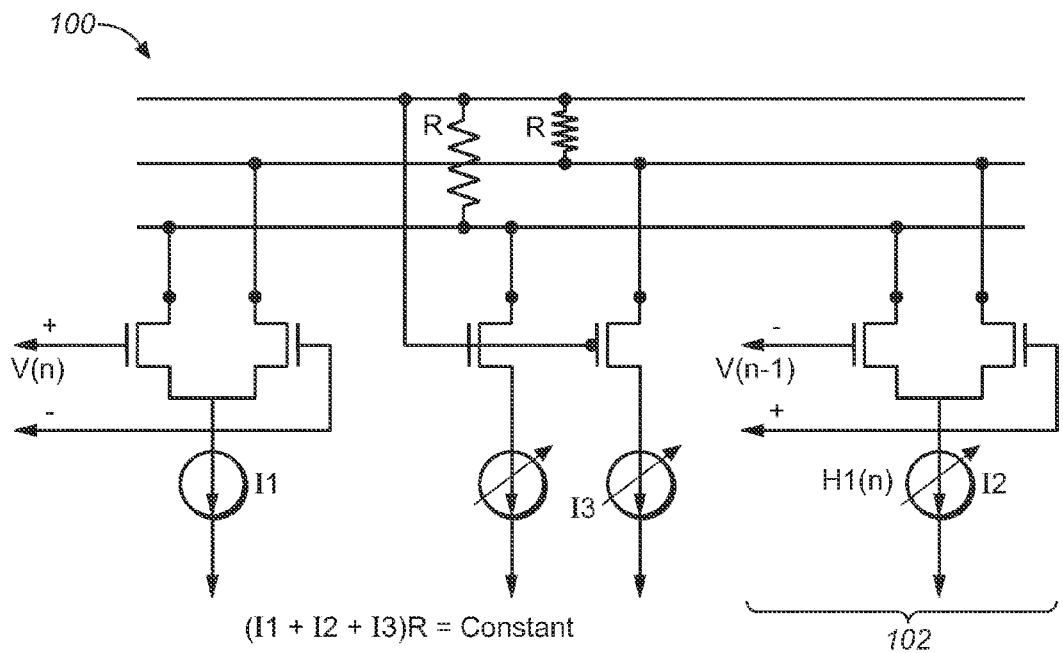
FIG. 1 is a circuit diagram illustrating a decision feedback equalizer (DFE) block.

A decision feedback equalizer (DFE) uses feedback of detected symbols in addition to conventional equalization. In order for the DFE to correctly restore the received signal, a process is used to adjust and stabilize tap coefficients of the equalizer. FIG. 1 is a circuit diagram depicting a DFE block 100. For illustrative purposes, only the first tap coefficient (commonly referred to as H1) is depicted in this DFE data path.

Figure 2:
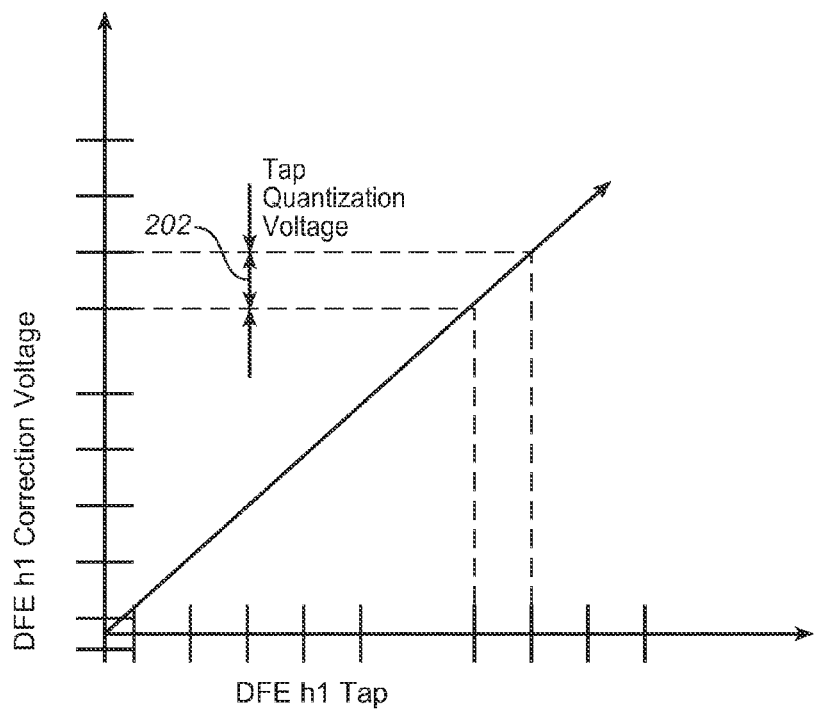
FIG. 2 is an illustration depicting relationship between DFE taps and DFE tap voltage.

As shown in FIG. 1, the DFE block 100 includes a tap coefficient control circuit 102 for controlling the voltage applied to the tap coefficient (H1 in this example). Typically, DFE acquisition and tracking is performed with fixed step DFE tap quantization as illustrated in FIG. 2. More specifically, the tap coefficient is set to an initial value at the start of the process and is increased by a fixed amount of correction voltage 202 at a time when the tap coefficient needs to be adjusted. Therefore, if a larger DFE tap quantization (may also be referred to as tap step) is used (i.e., the tap coefficient is increased by a larger correction voltage each time), the implementation cost and the DFE acquisition time can be reduced, at the expense of losing accuracy and decreasing steady state operating margin due to dithering of the DFE taps. On the other hand, if a smaller DFE tap quantization is used (i.e., the tap coefficient is increased by a smaller correction voltage each time), accuracy can be improved, but the implementation cost and the DFE acquisition time will both increase as the result.

In accordance with embodiments of the present disclosure, different DFE tap quantization values are utilized pre and post DFE acquisition. For instance, in one embodiment, a larger DFE tap quantization is used to drive DFE acquisition until DFE acquisition is detected. Subsequently, a smaller DFE tap quantization is used to provide finer adjustments, therefore providing improved accuracy.

Figure 3:
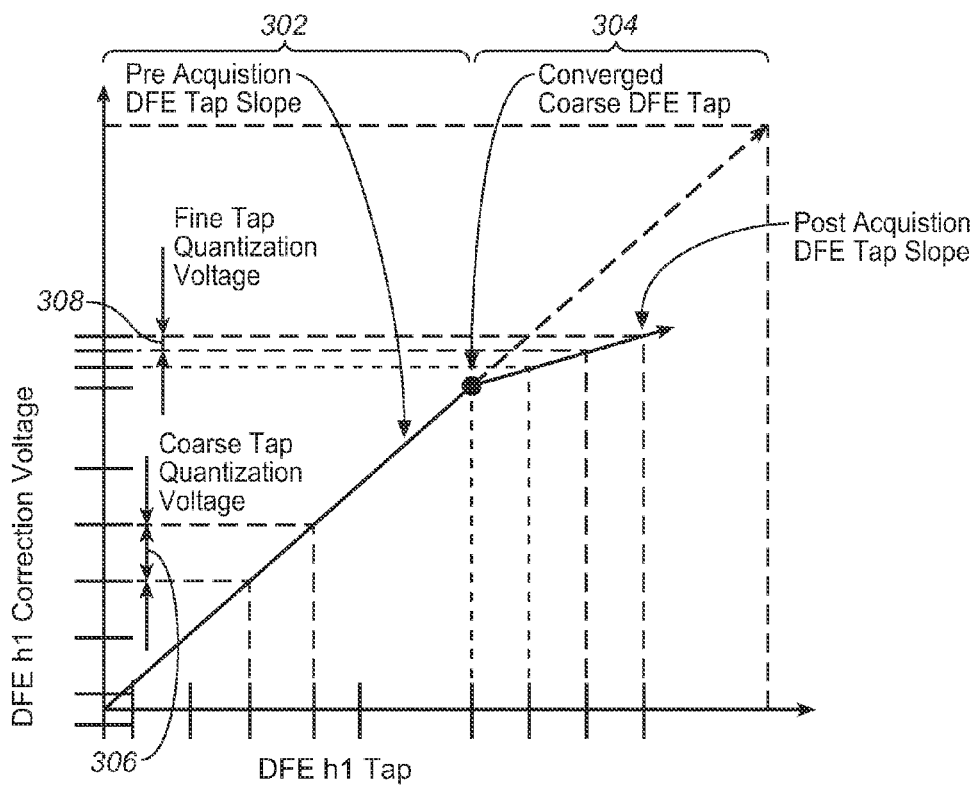
FIG. 3 is an illustration depicting relationship between DFE taps and DFE tap voltage, wherein different DFE tap quantization values are utilized pre and post DFE acquisition.

Referring to FIG. 3, an illustration depicting the pre and post-acquisition tap quantization adjustment is shown. During the DFE acquisition process (i.e., prior to DEF acquisition, or pre-acquisition 302), the DFE margin is not critical and the DFE tap quantization can be coarse. Therefore, a relatively larger tap quantization 306 is used to provide a faster but also a noisier acquisition. After acquisition is detected (i.e., post-acquisition 304), a relatively smaller tap quantization 308 is used to increase the resolution. It is contemplated that a finer/smaller tap quantization voltage results in reduced eye margin loss due to DFE tap dithering during steady state operation.

The effect of using different tap quantization values pre and post acquisition is shown in FIG. 3, where the slope of the DFE tap vs. DFE tap voltage transfer function is reduced after the DFE acquisition. It is contemplated that various techniques can be utilized to detect DFE acquisition. For instance, techniques such as that disclosed in: Transmitter Adaptation Loop Using Adjustable Gain and Convergence Detection, Mohammad Mobin et al., U.S. patent application Ser. No. 13/360,978 (the disclosure of which is incorporated herein by reference in its entirety) can be utilized. It is contemplated that various other techniques such as dither detection, rate of change based detection (e.g., convergence is detected when changes occur infrequently), or simple timer based approaches (e.g., convergence is detected after a predetermined amount of time) and the like can also be utilized without departing from the spirit and scope of the present disclosure.

Figure 4:
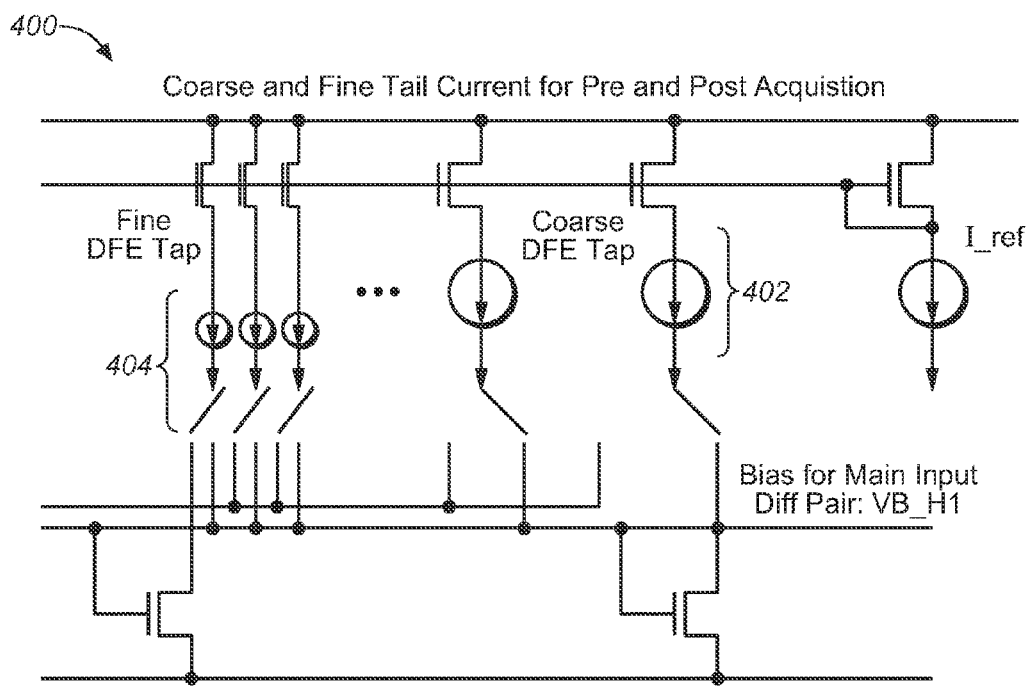
FIG. 4 is a circuit diagram illustrating a tap coefficient control circuit.

Referring now to FIG. 4, a circuit diagram depicting a tap coefficient control circuit 400 in accordance with an embodiment of the present disclosure is shown. The tap coefficient control circuit 400 includes a first set of DFE taps 402 and a second set of DFE taps 404. The taps in at least a subset of the first set of taps 402 are configured to provide substantially identical tap steps with respect to each other. That is, each tap in this subset has a predetermined first tap quantization. Similarly, the taps in at least a subset of the second set of taps 404 are configured to provide substantially identical tap steps with respect to each other, and each tap in this subset has a predetermined second tap quantization. It is contemplated that the first tap quantization is configured to be larger than the second tap quantization, and therefore able to change tap correction voltage more significantly compare to the second tap quantization. This allows the taps in the two DFE tap sets 402 and 404 to be selectively engaged/disengaged in order to provide the pre and post-acquisition tap quantization adjustment described above.

For instance, prior to the DFE acquisition, the taps in the first set 402 are selectively engaged to change the tap correction voltage according to the first tap quantization. In this manner, the tap correction voltage can be increased based on the first, coarse tap quantization. After convergence (i.e., acquisition) is detected, the first set 402 of DFE taps can be frozen (i.e., the engaged taps in the first set 402 remain engaged and the disengaged taps in the first set 402 remain disengaged) and the taps in the second set 404 are selectively engaged. This allows the tap correction voltage to be changed based on the second, finer tap quantization.

It is contemplated that in certain embodiments, a few of the taps in the second, finer tap set 404 can be pre-engaged prior to the DFE acquisition so that the taps in the second set 404 have certain usage swing at the start of the post-acquisition process. In this manner, if the correction voltage provided at the start of the post-acquisition process is deemed too low, one or more taps in the second set 404 that have not been pre-engaged can now be engaged to increase the total correction voltage. On the other hand, if the correction voltage is deemed too high at the start of the post-acquisition process, one or more taps in the second set 404 that have already been pre-engaged can be disengaged to reduce the total correction voltage.

More specifically, in one embodiment, about half of the taps in the second set 404 are pre-engaged prior to the DFE acquisition. Subsequently, the taps in the first set 402 are selectively engaged to change the tap correction voltage according to the first, coarse tap quantization. After convergence (i.e., acquisition) is detected, the first set 402 of DFE taps are frozen, and the taps in the second set 404 have a symmetric usage swing at the start of the post-acquisition process, allowing the total correction voltage to be either increased or decreased according to the second, finer tap quantization. This symmetric usage swing is depicted in curve 500 of FIG. 5, which shows the slope of the correction voltage after convergence is detected.

Figure 5:
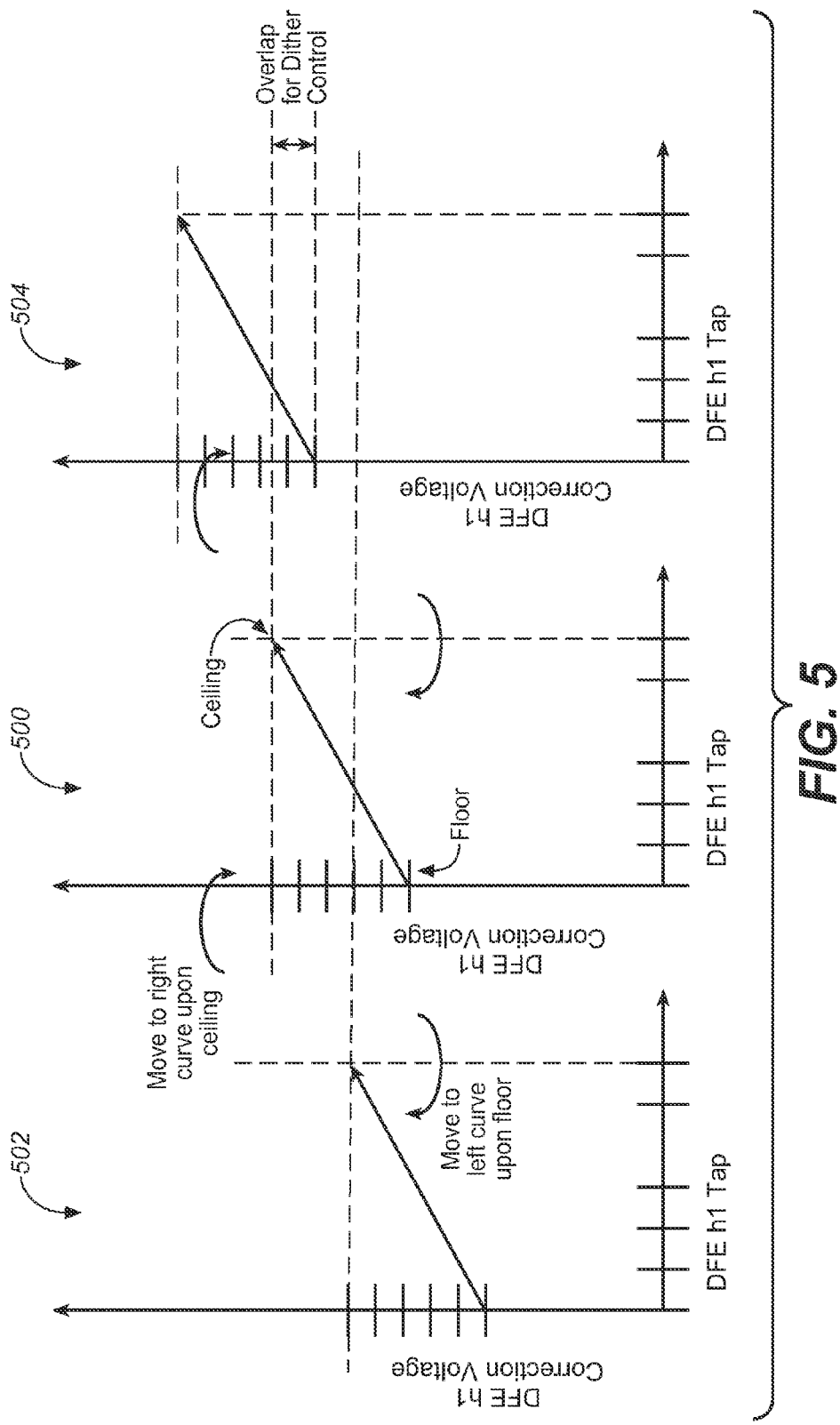
FIG. 5 is an illustration depicting boundary switching operations implemented in certain embodiments.

It is contemplated that in the event when the second, finer tap set 404 hits the ceiling (i.e., when all taps in the set 404 are engaged and the total correction voltage still needs to be increased), one of the currently disengaged taps in the first, coarse tap set 402 can be engaged to increase the total correction voltage and the process for selectively engaging the taps in the second set 404 can repeat again. Similarly, in the event when the second, finer tap set 404 hits the floor (i.e., when all taps in the set 404 are disengaged and the total correction voltage still needs to be decreased), one of the previously engaged taps in the first, coarse tap set 402 can be disengaged and the process for selectively engaging the taps in the second set 404 can repeat again. Such an operation is referred to as boundary switching, which can be performed whenever the second tap set 404 hits the ceiling or the floor, which may occur due to gain variations over temperature changes, voltage changes, humidity changes or the like. Curves 502 and 504 of FIG. 5 illustrate the effects of such boundary switching operations.

In one embodiment, the accumulated sum of the correction voltage applicable when all taps in the second, finer tap set 404 are engaged is configured to be greater than the first tap quantization. Mathematically, the second set 404 contains m number of taps each having a predetermined second tap quantization and m× second tap quantization ≥n× first tap quantization, where n≥1. Such a configuration is to allow a hysteresis buffer to be created to mitigate dithering, as well as to allow tracking of long term ambient variations.

Figure 6:
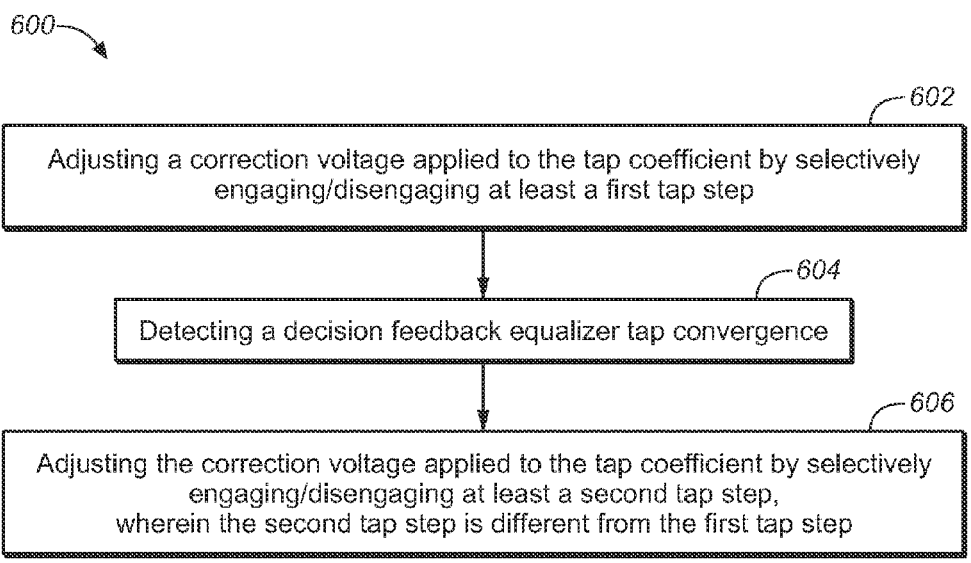
FIG. 6 is a flow diagram illustrating a method for controlling a tap coefficient for a decision feedback equalizer.

FIG. 6 is a flow diagram illustrating a method 600 for controlling a tap coefficient for a decision feedback equalizer. As previously described, step 602 adjusts the correction voltage applied to the tap coefficient by selectively engaging/disengaging taps in the first set of taps prior to DFE tap convergence. This allows the correction voltage to be adjusted (i.e., increased or decreased) based on the first tap quantization. Once DFE tap convergence is detected in step 604, step 606 subsequently adjusts the correction voltage applied to the tap coefficient by selectively engaging/disengaging taps in the second set of taps, allowing the correction voltage to be adjusted (i.e., increased or decreased) based on the second tap quantization.

It is contemplated that while only two DFE tap steps (quantization values) are depicted in the exemplary embodiments described above, the number of different DFE tap steps utilized are not limited to two. That is, the tap coefficient control circuit may utilize one or more additional DFE taps for providing different tap steps without departing from the spirit and scope of the present disclosure. For instance, a set of DFE taps providing tap steps that are even finer than the taps in the second set may be used to further improve the accuracy. Alternatively and/or additionally, a set of DFE taps providing tap steps that are even larger than the taps in the first set may also be used to further improve the speed of convergence. It is contemplated that the number of DFE tap sets, the number of DFE taps in each set, as well as the number of different DFE tap steps, may be determined based on various factors such as cost, timing, complexity and the like.

It is also contemplated that not all taps in a particular set of DFE taps are required to be identical with respect to other taps in the same set. As previously described, only a subset of taps in a given set of DFE taps needs to provide substantially identical tap quantization. That is, each DFE tap set can include a subset of taps having identical tap steps and also include some additional taps different from the taps in the subset of identical taps without departing from the spirit and scope of the present disclosure.

It is further contemplated that the tap coefficient control circuit described above is not limited for adjusting the first tap coefficient (commonly referred to as H1). Higher order tap coefficients can also be adjusted/controlled in the similar manner as described above without departing from the spirit and scope of the present disclosure.

In accordance with embodiments of the present disclosure, the steady states DFE tap quantization will be reduced and hence will effectively increase the DFE eye margin due to the reduction of DFE tap dithering. A larger/coarse tap quantization is used to provide a relatively faster DFE tap convergence. Subsequently, a smaller/finer tap quantization is activated after the DFE tap convergence to improve accuracy.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for controlling a tap coefficient for a decision feedback equalizer, the method comprising:
   adjusting a correction voltage applied to the tap coefficient based on a first tap quantization;
   detecting a decision feedback equalizer tap convergence; and
   adjusting the correction voltage applied to the tap coefficient based on a second tap quantization after the decision feedback equalizer tap convergence is detected, wherein the second tap quantization is different from the first tap quantization.

2. The method of claim 1, wherein the second tap quantization is smaller than the first tap quantization.

3. The method of claim 1, wherein adjusting a correction voltage applied to the tap coefficient based on a first tap quantization further comprising:
   incrementing the correction voltage applied to the tap coefficient based on at least one unit of the first tap quantization.

4. The method of claim 1, wherein adjusting the correction voltage applied to the tap coefficient based on a second tap quantization after the decision feedback equalizer tap convergence is detected further comprising:
   determining whether the correction voltage applied to the tap coefficient needs to be increased or decreased;
   incrementing the correction voltage applied to the tap coefficient based on at least one unit of the second tap quantization when the correction voltage applied to the tap coefficient needs to be increased; and
   decrementing the correction voltage applied to the tap coefficient based on at least one unit of the second tap quantization when the correction voltage applied to the tap coefficient needs to be decreased.

5. The method of claim 1, wherein the decision feedback equalizer tap convergence is detected utilizing at least one of: a dither detection technique, a rate of change based detection technique or a timer based detection technique.

6. The method of claim 1, wherein the decision feedback equalizer utilizes a plurality of tap coefficients, and the method is utilized for controlling each tap coefficient of the plurality of tap coefficients.

7. A tap coefficient control circuit for controlling a tap coefficient for a decision feedback equalizer, the tap coefficient control circuit comprising:
   a first set of taps for adjusting a correction voltage applied to the tap coefficient, wherein a tap step provided by at least each tap in a subset of the first set of taps is substantially identical with respect to each of the other taps in the subset of the first set of taps, and the tap step provided by the taps in the subset of the first set of taps is configured according to a predetermined first tap quantization;
   a second set of taps for adjusting the correction voltage applied to the tap coefficient, wherein a tap step provided by at least each tap in a subset of the second set of taps is substantially identical with respect to each of the other taps in the subset of the second set of taps, and the tap step provided by the taps in the subset of the second set of taps is configured according to a predetermined second tap quantization different from the first tap quantization; and
   a control circuit for selectively engaging at least the taps in the subset of the first set of taps prior to detection of a decision feedback equalizer tap convergence, the control circuit further configured selectively engaging at least the taps in the subset of the second set of taps after detection of the decision feedback equalizer tap convergence.

8. The tap coefficient control circuit of claim 7, wherein the second tap quantization is smaller than the first tap quantization.

9. The tap coefficient control circuit of claim 7, wherein an accumulated sum of tap steps provided by the taps in the subset of the second set of taps is greater than or equal to the first tap quantization.

10. The tap coefficient control circuit of claim 7, wherein the control circuit selectively engages or disengages at least one tap of the subset of the first set of taps prior to detection of the decision feedback equalizer tap convergence.

11. The tap coefficient control circuit of claim 7, wherein the control circuit selectively engages at least one tap of the subset of the second set of taps after detection of the decision feedback equalizer tap convergence when the correction voltage applied to the tap coefficient needs to be increased, and the control circuit selectively disengages at least one tap of the subset of the second set of taps after detection of the decision feedback equalizer tap convergence when the correction voltage applied to the tap coefficient needs to be decreased.

12. The tap coefficient control circuit of claim 7, wherein the control circuit pre-engages approximately half of the taps in the subset of the second set of taps.

13. A method for controlling a tap coefficient for a decision feedback equalizer, the method comprising:
    adjusting a correction voltage applied to the tap coefficient by selectively engaging at least taps in a subset of a first set of taps, wherein the taps in the subset of the first set of taps provide a substantially identical tap step with respect to each of the other taps in the subset of the first set of taps, and the tap step provided by the taps in the subset of the first set of taps is configured according to a predetermined first tap quantization;
    detecting a decision feedback equalizer tap convergence; and
    adjusting the correction voltage applied to the tap coefficient by selectively engaging at least taps in a subset of a second set of taps, wherein the taps in the subset of the second set of taps provide a substantially identical tap step with respect to each of the other taps in the subset of the second set of taps, and the tap step provided by the taps in the subset of the second set of taps is configured according to a predetermined second tap quantization different from the first tap quantization.

14. The method of claim 13, wherein the second tap quantization is smaller than the first tap quantization.

15. The method of claim 13, wherein an accumulated sum of tap steps provided by the taps in the subset of the second set of taps is greater than or equal to the first tap quantization.

16. The method of claim 13, wherein adjusting a correction voltage applied to the tap coefficient by selectively engaging at least taps in a subset of a first set of taps further comprising:
    selectively engaging at least taps in the subset of the first set of taps prior to detection of the decision feedback equalizer tap convergence.

17. The method of claim 13, wherein adjusting the correction voltage applied to the tap coefficient by selectively engaging at least taps in a subset of a second set of taps further comprising:
    determining whether the correction voltage applied to the tap coefficient needs to be increased or decreased;
    selectively engaging at least taps in the subset of the second set of taps when the correction voltage applied to the tap coefficient needs to be increased; and
    selectively disengaging at least taps in the subset of the second set of taps when the correction voltage applied to the tap coefficient needs to be decreased.

18. The method of claim 13, further comprising:
    pre-engaging approximately half of taps in the subset of the second set of taps prior to adjusting the correction voltage applied to the tap coefficient by selectively engaging taps in the subset of the first set of taps.

19. The method of claim 13, further comprising:
    engaging at least one additional tap in the subset of the first set of taps when the second set of taps reaches a ceiling value.

20. The method of claim 13, further comprising:
    disengaging at least one tap in the subset of the first set of taps when the second set of taps reaches a floor value.

* * * * *